United States Patent [19]
Hong

[11] Patent Number: 5,684,679
[45] Date of Patent: Nov. 4, 1997

[54] SWITCHING MODE POWER SUPPLY CAPABLE OF REDUCING THE RESPONSE TIME THEREOF

[75] Inventor: Jae-Gyoo Hong, Seoul, Rep. of Korea

[73] Assignee: Daewoo Electronics Co., Ltd., Seoul, Rep. of Korea

[21] Appl. No.: 578,767

[22] Filed: Dec. 26, 1995

[30] Foreign Application Priority Data

Mar. 31, 1995 [KR] Rep. of Korea ................. 95-7283

[51] Int. Cl.⁶ ........................................ H02M 3/335
[52] U.S. Cl. ..................... 363/21; 363/49; 363/53; 307/33; 361/220; 327/318
[58] Field of Search .................. 363/21, 49, 44, 363/45, 53, 97, 131; 307/33; 361/220; 327/318

[56] References Cited

U.S. PATENT DOCUMENTS 4,246,634  1/1981  Purol ............................. 363/49
5,452,195  9/1995  Lehr et al. ..................... 363/21

Primary Examiner—Stuart N. Hecker
Assistant Examiner—Shawn Riley
Attorney, Agent, or Firm—Anderson Kill & Olick P.C.

[57] ABSTRACT

A novel switching mode power supply (SMPS), which is capable of substantially reducing the response time of the SMPS for generating a plurality of regulated DC output voltages from an AC input power, comprises a first rectifier for rectifying the AC input power to produce a rectified AC power signal within a predetermined range; a transforming device for generating a plurality of scaled-down AC power signals from the rectified AC power signal; a second rectifier for producing and providing a plurality of regulated DC output voltages from the plurality of scaled-down AC power signals to the plurality of loads through respective load lines connected thereto; and a unit for grounding the rectified AC power signal previously charged in the first rectifier if there occurs a disruption in the supply of the AC input power to the SMPS, to thereby promptly produce the plurality of regulated DC output voltages when the supply of the AC input power is resumed.

2 Claims, 1 Drawing Sheet

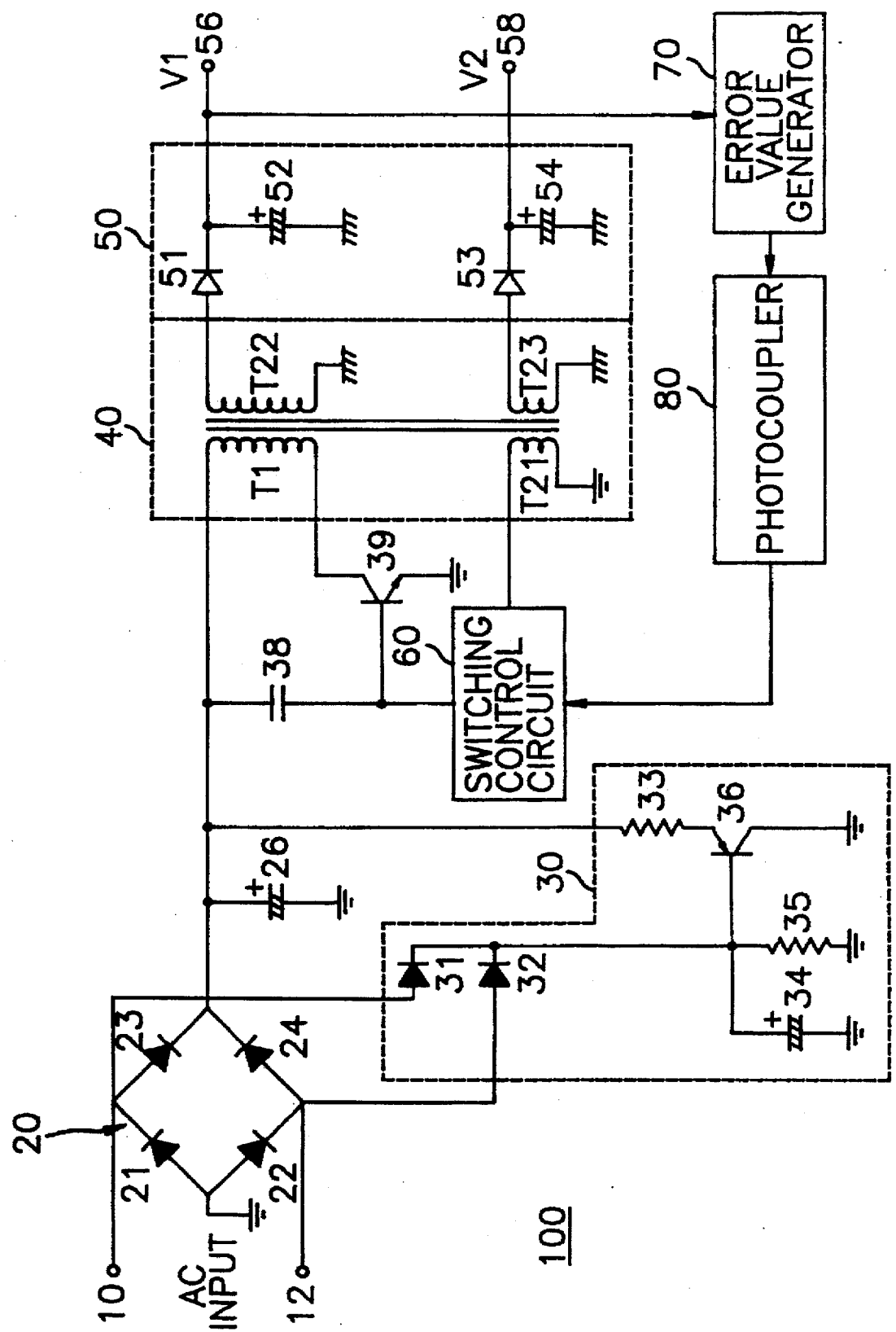

SWITCHING MODE POWER SUPPLY CAPABLE OF REDUCING THE RESPONSE TIME THEREOF

FIELD OF THE INVENTION

The present invention relates to a switching mode power supply (SMPS); and, more particularly, to an improved SMPS for effectively processing a rectified AC power previously charged therein, in the event of an AC input power failure, to thereby reduce the response time of the SMPS to produce regulated DC output voltages when the AC input power is recovered and resupplied thereto.

BACKGROUND OF THE INVENTION

As is well known, the SMPS is widely utilized in various electronic/electrical applications. The SMPS, which is generally preferred by the industry for its high performance and compactness compared with a general power supply, serves to convert an AC input power to a plurality of stable DC voltages. The SMPS basically includes a full-wave rectifier for rectifying the AC input power, a smoothing device for smoothing or filtering high frequency components contained in the rectified AC input power, a transformer for scaling down the voltage of the smoothed AC input power to provide a plurality of scaled-down AC voltages, and a rectifying device having a plurality of diodes and bulk capacitors for rectifying and smoothing the plurality of scaled-down AC voltages to produce and provide regulated DC voltages to relevant loads. The SMPS further includes an initial driving capacitor, a switching transistor and a switching control circuit to produce a switching control signal.

In the SMPS, the switching transistor is activated first by the rectified AC input power via the initial driving capacitor at an initial time ($t_o$). From then on, the switching transistor is controlled by the switching control signal. Normally, the switching control signal serves to convert the sinusoidal form of the AC input current to a form of narrow pulses whose peaks roughly follow a sinusoidal form. Such a current form tends to not only increase a power factor but also reduce stresses on the full-wave rectifier, wherein the power factor as used herein represents a ratio between an actual power and an apparent power.

Supply of an AC input power to a SMPS may sometimes be interrupted due to, e.g., a power failure, an overload at a load coupled thereto and the like, thereby halting the generation of regulated DC voltages from the SMPS. In such event, to promptly resume the production of regulated DC voltages from the SMPS when the AC input power is recovered or supplied thereto, the rectified AC power, which has been previously charged in the smoothing device, is normally discharged through such devices as the initial driving capacitor, the switching transistor, the switching control circuit and the primary winding coil of the transformer, wherein the time required for discharging the charged AC power depends on a time constant which is proportional to a total impedance value of all the devices involved in the discharging.

Since, however, the total impedance value is generally large, a conventional SMPS is incapable of generating the regulated DC voltages for a period equivalent to a response time determined by the large total value of impedance, even though supply of the AC input power thereto has already been resumed.

SUMMARY OF THE INVENTION

It is, therefore, a primary object of the present invention to provide an improved SMPS for effectively processing a rectified AC power previously charged therein in the event of a disruption in the supply of AC input power failure thereto, thereby substantially reducing the response time of the SMPS for producing regulated DC voltages when the supply of AC input power is resumed.

In accordance with the invention, there is provided an improved SMPS for outputting a plurality of regulated DC output voltages from an AC input power to a plurality of loads, which comprises:

- a first rectifier for rectifying and charging the AC input power to produce a rectified AC power signal within a predetermined range;
- a transforming device for generating a plurality of scaled-down AC power signals from the rectified AC power signal;
- a second rectifier for producing and providing a plurality of regulated DC output voltages from the plurality of scaled-down AC power signals to the plurality of loads through respective load lines connected thereto; and
- a unit for grounding the rectified AC power signal previously charged in the first rectifier if there occurs a disruption in the supply of the AC input power to the SMPS, to thereby promptly produce the plurality of regulated DC output voltages when the supply of the AC input power is resumed.

BRIEF DESCRIPTION OF THE DRAWING

The above and other objects and features of the present invention will become apparent from the following description of preferred embodiments given in conjunction with the accompanying drawing, which is a block diagram of the invention illustrating a novel SMPS capable of reducing the response time thereof.

DETAILED DESCRIPTION OF THE PREFERRED EMBODIMENTS

Referring to the drawing, there is illustrated a block diagram of a novel SMPS 100 provided with a discharging circuit 30 of the present invention. The SMPS 100 for transforming an AC input power into a plurality of desired voltages, e.g., two regulated DC output voltages, V1 and V2, comprises a first bridge rectifier 20, a smoothing capacitor 26, the discharging circuit 30, an initial driving capacitor 38, a switching transistor 39, a transformer 40, a rectifying device 50, a switching control circuit 60, an error value generator 70 and a photocoupler 80.

As shown in the drawing, an AC input power on lines 10 and 12 is rectified through the first bridge rectifier 20 including four rectifying diodes 21 to 24 and also rectified by a second bridge rectifier also including four rectifying diodes, i.e., the diodes 21 and 22, and diodes 31 and 32 included in the discharging circuit 30. The first rectified AC power from the first bridge rectifier 20 is supplied via the smoothing capacitor 26 to a resistor 33 of the discharging circuit 30, the transformer 40 and the initial driving capacitor 38, while the second rectified AC power from the second bridge rectifier is fed to the base of a switching transistor 36 through a capacitor 34 and a resistor 35 of the discharging circuit 30.

The smoothing capacitor 26, which is connected across the output of the first bridge rectifier 20, serves to bypass high frequency riffles to prevent them from showing up on the rectified AC power from the first bridge rectifier 20. The initial driving capacitor 38 connected between the output of the smoothing capacitor 26 and the base of the switching transistor 39 serves to transmit a large amount of electric current from the smoothing capacitor 26 to the base of the switching transistor 39 at an initial time ($t_o$) as its initial driving control signal. After the initial time ($t_o$), the initial driving capacitor 38 transmits only a small amount of electric current from the smoothing capacitor 26 to the base of the switching transistor 39.

The switching transistor 39, wherein its base is coupled to the initial driving capacitor 38 and the switching control circuit 60, and its collector is connected to a primary winding coil T1 of the transformer 40, alternatingly opens and closes the primary winding coil T1 of the transformer 40. As is well known in the art, operation of the switching transistor 39 is controlled first by the current from the initial driving capacitor 38 at the initial time ($t_o$), but from then on, the operation is controlled by a switching control signal from the switching control circuit 60 since the amount of electric current from the initial driving capacitor 38 thereto becomes extremely small, as mentioned above. This operation, as is well known in the art, enables the sinusoidal shape of the AC input power to be converted to a form of narrow pulses whose peaks roughly follow a sinusoidal form, thereby increasing the power factor of the SMPS.

As shown in the drawing, the transformer 40 has a primary winding coil T1 and three secondary winding coils T21 to T23. One terminal of the primary winding coil T1 is coupled to the bridge rectifier 20, the smoothing capacitor 26 and the initial driving capacitor 38, and the other terminal thereof is connected to the collector of the switching transistor 39. On the other hand, one terminal of the first secondary winding coil T21 is connected to the switching control circuit 60 and the other terminal thereof is earthed. One terminal of the second secondary winding coil T22 is coupled to the anode of a rectifying diode 51 of the rectifying device 50, while the other terminal thereof is grounded. Finally, one terminal of the third secondary winding coil T23 is coupled to the anode of a rectifying diode 53 of the rectifying device 50, and the other terminal thereof is grounded. The transformer 40, as is well known in the art, serves to scale down the output power from the smoothing capacitor 26 to produce a plurality of scaled-down AC signals, e.g., two scaled-down AC power signals.

The two scaled-down AC power signals produced by the transformer 40 are provided to their corresponding rectifying diodes 51 and 53 of the rectifying device 50, respectively. At the rectifying device 50 including the rectifying diodes 51 and 53, and bulk capacitors 52 and 54, each of the high frequency components of the two scaled-down AC power signals is rectified and smoothed to produce and provide two regulated DC output voltages, V1 and V2, to corresponding load lines 56 and 58, respectively. Further, one of the two regulated DC output voltages, V1 and V2, e.g., V1, is supplied to the error value generator 70.

The error value generator 70, which is connected across the output of the bulk capacitor 52 of the rectifying device 50, serves to monitor the regulated DC output voltage, V1, from the bulk capacitor 52, or the corresponding current value on the first load line 56 to derive an error value denoting the difference between a monitored voltage value and a predetermined value TH1, wherein TH1 is a real number. Thereafter, the error value is provided to the photocoupler 80.

The photocoupler 80, as is well known in the art, which may include a light emitting diode and a photo-transistor (not shown), isolates the switching control circuit 60 from the error value generator 70 by converting the electronic signal of the error value to a light signal through the light emitting diode and recover the light signal back to the electronic signal through the photo-transistor.

The switching control circuit 60 connected to the first secondary winding coil T21, the base of the switching transistor 39 and the photocoupler 80 produces a switching control signal which enables the switching transistor 39 to perform an on-and-off operation. As is well known in the art, the switching control circuit 60 adjusts the width of a pulse of the switching control signal according to a change of a voltage value on the first load line 56. By properly changing the pulse width of the switching control signal in accordance with the electronic signal from the error value generator 70, the desired DC output voltages, V1 and V2, can be obtained.

On the other hand, the discharging circuit 30 of the present invention includes the switching transistor 36, the resistors 33 and 35, the diodes 31 and 32 and the capacitor 34. As shown in the drawing, the base of the switching transistor 36 is coupled to each of the cathodes of the diodes 31 and 32, the resistor 35 and the capacitor 34, respectively, while the emitter thereof is connected to the resistor 33. For the purpose of simplicity, in an exemplary embodiment of the invention, it is assumed that the switching transistor 36 is a PNP transistor and an impedance value of the resistor 33 is much smaller than a total impedance value, $Z_{total}$, of the initial driving capacitor 38, the switching transistor 39, the switching control circuit 60, the photocoupler 80 and the primary and the first secondary winding coils T1 and T21 of the transformer 40. And, it is reasonable to assume that a time constant value which may be derived by multiplying impedance values of the capacitor 34 and the resistor 35 is much smaller than that of a combination of an impedance value of the smoothing capacitor 26 and the total impedance value, $Z_{total}$. It should be appreciated that the two time constants can be determined based on the required efficiency of the SMPS.

As can be seen from the above, in a normal operation, i.e., in case where the AC input power is supplied to the second bridge rectifier, the switching transistor 36 is turned off by the second rectified AC input power from the second bridge rectifier. In this case, the first rectified AC input power from the smoothing capacitor 26 is not grounded or discharged, but supplied to the initial driving capacitor 38 and the primary winding coil T1 of the transformer 40, thereby generating the regulated DC output voltages, V1 and V2, on the load lines 56 and 58, respectively.

On the other hand, in case where the AC input power is not inputted to the second bridge rectifier for a time longer than a predetermined time which may be equal to or smaller than the time constant derived from combining of the impedances of the capacitor 34 and the resistor 35, the switching transistor 36 will be turned on. As a result, the first rectified AC power previously charged in the smoothing capacitor 26 is directly grounded through the resistor 33 having a small value of impedance, thereby promptly producing the desired DC output voltages, V1 and V2, on the load lines 56 and 58, respectively, when the supply of the AC input power to the first bridge rectifier 20 and the second bridge rectifier is resumed.

As shown above, the present invention is capable of effectively removing or discharging processing a rectified AC power previously charged in the smoothing capacitor incorporated in the SMPS in the event of a power failure, thereby substantially reducing the response time of the SMPS to produce regulated DC output voltages when the supply of AC input power is resumed.

While the present invention has been shown and described with respect to the particular embodiments, it will be apparent to those skilled in the art that many changes and modifications may be made without departing from the spirit and scope of the invention as defined in the appended claims.

What is claimed is:

1. A switching mode power supply (SMPS) for generating and supplying a plurality of regulated DC output voltages by rectifying an AC input power to a plurality of loads, which comprises:

first rectifying means for rectifying the AC input power to produce a first rectified AC power signal;

transforming means, including an initial driving capacitor, a switching transistor and a switching control circuit, for generating a plurality of scaled-down AC power signals by using the first rectified AC power signal, wherein operation of the switching transistor is controlled by a power signal from the initial driving capacitor at an initial time, and from then on, the operation is controlled by a switching control signal from the switching control circuit;

second rectifying means for producing a plurality of regulated DC output voltages by utilizing the plurality of scaled-down AC power signals; and discharging means for grounding the first rectified AC power signal previously charged in the first rectifying means if there occurs a disruption in the supply of the AC input power to the SMPS for a predetermined time period, to thereby produce the plurality of regulated DC output voltages when the supply of the AC input power is resumed.

2. The SMPS according to claim 1, wherein the discharging means includes:

means for rectifying the AC input power to produce a second rectified AC power signal;

means for monitoring a level of the second rectified AC power signal; and means for grounding the first rectified AC power signal in the first rectifying means if the monitored level of the second rectified AC power signal is in a first logic level for the predetermined time period, to thereby generate the plurality of regulated DC output voltages when the AC input power is resupplied to the SMPS.

* * * * *